US011302200B2

(12) United States Patent
Foltan et al.

(10) Patent No.: US 11,302,200 B2
(45) Date of Patent: Apr. 12, 2022

(54) METHODS AND SYSTEMS FOR ASSIGNING PROCEDURES TO FLIGHT RECORDS

(71) Applicant: HONEYWELL INTERNATIONAL INC., Morris Plains, NJ (US)

(72) Inventors: Stanislav Foltan, Slovakia (CZ); Federico Gentile, Brno (CZ); Karol Molnar, Kanice (CZ)

(73) Assignee: Honeywell International Inc., Charlotte, NC (US)

( * ) Notice: Subject to any disclaimer, the term of this patent is extended or adjusted under 35 U.S.C. 154(b) by 267 days.

(21) Appl. No.: 16/299,399

(22) Filed: Mar. 12, 2019

(65) Prior Publication Data

US 2020/0294405 A1    Sep. 17, 2020

(51) Int. Cl.
*G08G 5/00* (2006.01)
*G06Q 10/06* (2012.01)

(52) U.S. Cl.
CPC ....... *G08G 5/0039* (2013.01); *G06Q 10/0633* (2013.01); *G08G 5/0073* (2013.01)

(58) Field of Classification Search
CPC . G08G 5/0039; G08G 5/0073; G06Q 10/0633
See application file for complete search history.

(56) References Cited

U.S. PATENT DOCUMENTS

| 6,259,977 | B1 | 7/2001 | Mayer et al. | |
| 6,278,913 | B1* | 8/2001 | Jiang | G07C 5/0858 244/158.1 |
| 8,204,637 | B1 | 6/2012 | Everson et al. | |
| 9,558,670 | B1* | 1/2017 | Sheth | G01C 21/005 |
| 10,467,913 | B1* | 11/2019 | Suiter | G08G 5/0091 |
| 2011/0144897 | A1 | 6/2011 | Dunsky | |
| 2011/0172914 | A1* | 7/2011 | Coulmeau | G08G 5/0034 701/532 |
| 2012/0316724 | A1 | 12/2012 | Verlut | |
| 2015/0197330 | A1 | 7/2015 | Mayer et al. | |
| 2016/0093219 | A1 | 3/2016 | Bailey et al. | |
| 2017/0291715 | A1 | 10/2017 | Jayathirtha et al. | |
| 2020/0334993 | A1* | 10/2020 | Demri | G08G 5/045 |

FOREIGN PATENT DOCUMENTS

AU    2010317648 B2    5/2011

OTHER PUBLICATIONS

Extended European Search Report dated Dec. 10, 2020 in European Application No. 20161658.8 (10 pages).

* cited by examiner

*Primary Examiner* — Mathew Franklin Gordon
(74) *Attorney, Agent, or Firm* — Bookoff McAndrews, PLLC (57) ABSTRACT

Methods and systems are provided for analyzing flight records to assign procedures to the flight records. One method involves identifying a set of procedures for potential association with a flight record based at least in part on a runway associated with the flight record, identifying a probable procedure from among the set of procedures based on a relationship between a trajectory associated with the probable procedure and flight data associated with the flight record, and updating the flight record to maintain an association with the probable procedure. The flown trajectory represented by the flight data is mapped to the procedure trajectories to identify the probable procedure executed during the flight associated with the flight record based on the relative adherence of the flown trajectory to the procedural legs that constitute the procedure trajectory.

20 Claims, 5 Drawing Sheets

METHODS AND SYSTEMS FOR ASSIGNING PROCEDURES TO FLIGHT RECORDS

STATEMENT REGARDING SPONSORED RESEARCH OR DEVELOPMENT

The project leading to this application has received funding from the SESAR Joint Undertaking under grant agreement No 734161 under European Union's Horizon 2020 research and innovation programme.

TECHNICAL FIELD

The subject matter described herein relates generally to vehicle systems, and more particularly, embodiments of the subject matter relate to aircraft systems and methods for retrospectively assigning an aircraft procedure to a flight record based on flight data associated with the flight record.

BACKGROUND

Published aeronautical charts, such as, for example, Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like, depict and describe the procedures for operating aircraft at or in the vicinity of various airports, runways, or other landing and/or departure locations. These charts graphically illustrate and describe the specific procedure information and instructions (e.g., minimum descent altitudes, minimum runway visual range, final course or heading, relevant radio frequencies, missed approach procedures) to be followed or otherwise utilized by a pilot for executing a particular aircraft procedure. These charts are typically provided by a governmental or regulatory organization, such as, for example, the Federal Aviation Administration in the United States.

Many airports have numerous different published procedures associated with a particular runway, and the particular procedures flown during flight are often assigned by air traffic control (ATC) during flight. Thus, aircraft operators lack any knowledge or insight regarding what procedures will be flown prior to flight. Additionally, in practice, the procedure "as flown" by the aircraft will likely deviate from the exact specifications provided in the published procedure, thereby complicating retrospective analysis. The lack of knowledge regarding what procedures were flown limits the aircraft operator's availability to analyze the costs or other potential impacts attributable to different procedures. Accordingly, it is desirable to facilitate retrospective analysis of flown procedures to facilitate more efficient or otherwise improved operations. Furthermore, other desirable features and characteristics will become apparent from the subsequent detailed description and the appended claims, taken in conjunction with the accompanying drawings and this background.

BRIEF SUMMARY

Methods and systems are provided for analyzing flight records to assign procedures to the flight records. One method involves identifying a set of procedures for potential association with a flight record based at least in part on a runway associated with the flight record, identifying a probable procedure from among the set of procedures based on a relationship between a trajectory associated with the probable procedure and flight data associated with the flight record, and updating the flight record to maintain an association with the probable procedure. The flown trajectory represented by the flight data is mapped to the procedure trajectories to identify the probable procedure executed during the flight associated with the flight record based on the relative adherence of the flown trajectory to the procedural legs that constitute the procedure trajectory.

In one embodiment, a method for analyzing a flight record for a flight completed by an aircraft is provided. The method involves obtaining aircraft position data defining an aircraft trajectory for the flight completed by the aircraft, by the at least one processor, wherein the flight record maintains the aircraft position data in association with identification of an airport and a runway associated with the flight. The method continues performing an analysis of the aircraft position data by accessing a database comprising at least a potential procedure applicable to the airport and the runway, the potential procedure comprising a set of instructions directing aircraft use of a set of legs, analyzing the aircraft trajectory and the potential procedure to identify a realization of the set of instructions, and when the aircraft position data indicates a realization of the set of instructions, determining that the aircraft trajectory includes the potential procedure. The method continues by identifying a procedure flown by the aircraft during the flight, based on the analysis, wherein the procedure comprises the potential procedure and updating the flight record to store the procedure in the data storage element in association with the flight record.

In another embodiment, a system is provided that includes a data storage element to maintain a flight record comprising flight data pertaining to operation of an aircraft in connection with a runway at an airport and a processing system coupled to the data storage element to identify a subset of procedures associated with the runway, determine one or more adherence metrics associated with each procedure of the subset based on a relationship between the flight data and respective procedure legs of the respective procedure, identify a probable procedure from among the subset of the procedures based on the one or more adherence metrics, and assign the probable procedure to the flight record in the data storage element.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein generally relate to systems and methods for retrospectively analyzing travel data and mapping the travel data to a predefined procedure. In this regard, although the subject matter is described herein primarily in an aviation context involving flight records where flight data representing an aircraft procedure as it was flown is utilized to identify that procedure by mapping the flight data back to the constituent legs or segments of that procedure, it should be understood that the subject matter may be similarly utilized in other applications involving execution of a predefined travel procedure in the context of travel records or vehicle management systems associated with another type of vehicle (e.g., automobiles, marine vessels, trains), and the subject matter described herein is not necessarily limited to use with aircraft or in an aviation environment.

As described in greater detail below, exemplary embodiments described herein map the trajectory defined by data captured during flight to a particular procedure and thereby identify that procedure as having been flown by the aircraft. Based on the particular airport, runway, and potentially other constraints, a set of potential aircraft procedures may be initially identified. Thereafter, the flown trajectory is compared to the constituent legs or segments of each procedure of the set of potential procedures to determine the degree to which the flown trajectory adheres to the defined trajectory associated with that respective procedure. In this regard, for each procedure being analyzed, one or more adherence metrics may be calculated or otherwise determined to quantify the relative degree to which the flown trajectory aligns with the defined trajectory for that respective procedure. After analyzing all of the potential procedures, the potential procedures may be sorted, ranked, or otherwise ordered according to their respective adherence metric(s). In one or more exemplary embodiments, the potential procedure having the highest rank or priority is selected or otherwise identified as the procedure that the flown trajectory corresponds to, and then assigns or otherwise associates the flight record or data set for that flight with the identified procedure.

After identifying the procedure that was flown, the flight data representing that identified procedure as it was flown by the aircraft may be analyzed or otherwise utilized to determine one or more performance metrics associated with the identified procedure (e.g., an estimated fuel required for executing the segment, an estimated time required for executing the segment, an estimated cost index value for executing the segment, and/or the like). Additionally, the flight data may be utilized to quantify or qualify operational norms for executing the procedure, identify anomalous deviations from the procedure, identify potential risks associated with executing the procedure, or otherwise assess the procedure for purposes of safety, training, efficiency, and/or the like based on the as-flown trajectory. In this regard, aggregated flight data from different flight records that individually represent different trajectories mapped to the same procedure may be analyzed or combined to determine a nominal trajectory or probabilistic trajectory for the procedure, and based thereon, calculate or otherwise nominal or probabilistic estimates of the costs or performance associated with that procedure.

Figure 1:
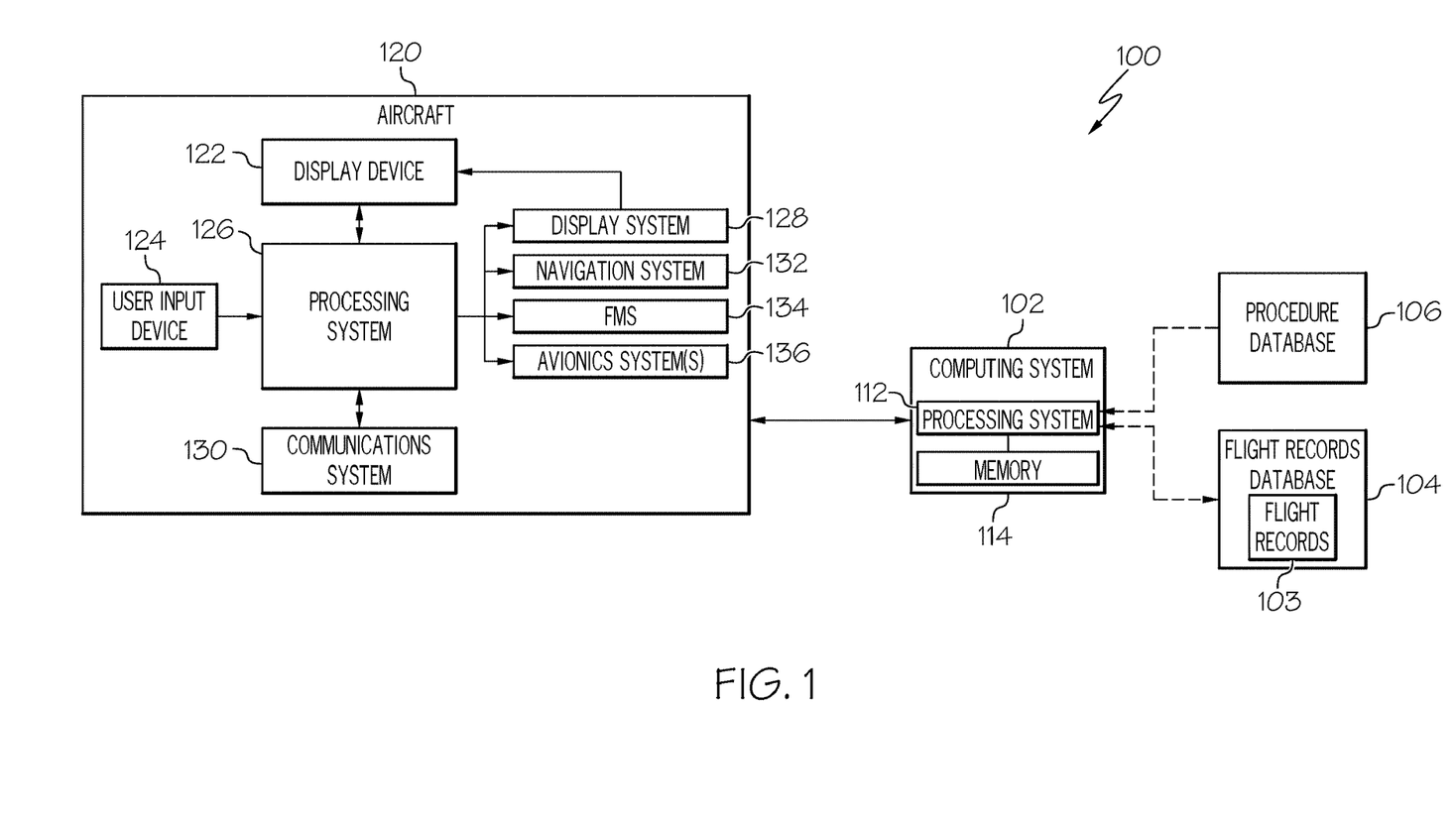
FIG. 1 is a block diagram of a flight analysis system for an aircraft in an exemplary embodiment.

FIG. 1 depicts an exemplary embodiment of a flight analysis system 100 for an aircraft 120. The illustrated system 100 includes computing system 102 that receives flight data from one or more aircraft 120 and creates or otherwise maintains, in a data storage element 104, flight records 103 that store the flight data corresponding to individual flights by an aircraft 120. The computing system 102 also obtains procedure information from a procedure database 106 or similar data storage, and for each flight record 103, the computing system 102 maps the trajectory represented by a subset of the flight data to an aircraft procedure that is then assigned or otherwise associated with that flight record 103 for further analysis.

In various embodiments, the computing system 102 may be located at a ground operations center or other facility located on the ground that is equipped to track, analyze, and otherwise monitor operations of one or more aircraft 120. In an exemplary embodiment, the computing system 102 includes a processing system 112 and a data storage element 114. The processing system 112 generally represents the hardware, circuitry, processing logic, and/or other components configured to map flight data to individual procedures and perform additional processes, tasks and/or functions to support operation of the flight analysis system 100, as described in greater detail below. Depending on the embodiment, the processing system 112 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The data storage element 114 generally represents any sort of memory or other computer-readable medium (e.g., RAM memory, ROM memory, flash memory, registers, a hard disk, or another suitable non-transitory short- or long-term storage media), which is capable of storing computer-executable programming instructions or other data for execution that, when read and executed by the processing system 112, cause the processing system 112 to execute and perform one or more of the processes tasks, operations, and/or functions described herein.

In one or more embodiments, the computing system 102 includes one or more physical interfaces, such as ports, card readers, disk readers, and/or the like that are communicatively coupled to the processing system 112 that allow the processing system 112 to access, retrieve, or otherwise obtain the flight data captured by an aircraft 120 via a corresponding physical medium (e.g., a memory card, a flash drive, a Universal Serial Bus (USB) cable, or the like). That said, in other embodiments, the computing system 102 may include a network interface or other communications interface or system communicatively coupled to the processing system 112 that allows the processing system 112 to access, retrieve, or otherwise obtain the flight data captured by an aircraft 120 via a communications network, such as the Internet, a satellite network, a cellular network, or the like, that supports unicast or point-to-point communications to/from the aircraft 120. In some embodiments, the computing system 102 may include hardware and/or other components configured to support data link communications to/from the aircraft 120 using a data link infrastructure and/or a data link service provider.

The data storage element 104, alternatively referred to herein as the flight record database, generally represents any sort of memory or other computer-readable medium capable of storing or maintaining flight data in different flight record entries 103. In exemplary embodiments, each flight record entry 103 corresponds to an individual flight flown by an aircraft 120 from a departure airport to a destination airport. The flight record 103 may maintain an association between the departure airport, the departure runway utilized at the departure airport, the destination airport, the destination runway (or arrival runway) utilized at the destination airport, and aircraft position data samples (alternatively referred to herein as aircraft position reports) that were captured or otherwise obtained during flight while en route between the departure and destination airports. In this regard, aircraft position reports may be created by a system onboard the aircraft 120 periodically recording or capturing the current latitude, current longitude, current altitude, the current heading, the current speed, and other flight data characterizing the status of the aircraft 120. In exemplary embodiments, the flight record entry 103 is also capable of maintaining an association with particular aircraft procedures flown by the aircraft 120 while en route between the departure and destination airports, as described in greater detail below.

As described in greater detail below, in an exemplary embodiment, the computing system 102 includes or otherwise accesses data storage element 106, alternatively referred to herein as the procedure database, which contains aircraft procedure information for a plurality of airports and maintains the association between the aircraft procedure information for different aircraft procedures and their corresponding airports and/or runways. As used herein, aircraft procedure information should be understood as a set of operating parameters or instructions associated with a particular aircraft action (e.g., approach, departure, arrival, climbing, and the like) that may be undertaken by the aircraft 120 at or in the vicinity of a particular airport. In an exemplary embodiment, the procedure information for a particular aircraft action (or aircraft procedure) includes various possible criteria for various categories or types of procedure information (e.g., the name or identification of the procedure, possible radio frequencies for the procedure, possible minima for the procedure, auxiliary instructions or notes on the procedure, and the like) along with information that defines the trajectory associated with a respective procedure (e.g., navigational reference points, navigational segments, procedure turns, and the like) or otherwise provides the operating parameters or instructions for executing the aircraft action associated with the respective procedure. For example, the procedure information for an approach procedure for an airport may include categories for the name or identification of the approach, the possible radio frequencies for the approach, the possible minima for the approach, instructions or notes on the missed approach procedure, and the like, along with information characterizing the navigational segments (or legs) that make up the approach course or otherwise defining the operating parameters or instructions for operating the aircraft in accordance with the respective procedure.

As used herein, an airport should be understood as referring to a location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival (or descent), a departure (or takeoff), an ascent (or climb), taxiing, or another aircraft action associated with an airport and having associated aircraft procedure information. For example, each airport may have one or more predefined aircraft procedures associated therewith (e.g., approach procedures, departure procedures, arrival routes, departure routes, and the like), wherein the aircraft procedure information for each aircraft procedure at each respective airport may be maintained by the procedure database 106. The aircraft procedure information may be provided by or otherwise obtained from a governmental or regulatory organization, such as, for example, the Federal Aviation Administration in the United States. The aircraft procedure information may include instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like.

As described in greater detail below, the aircraft procedure information for a given procedure defines a number of procedural legs that constitute the trajectory for the procedure. In exemplary embodiments, each procedural leg is defined by a leg path and a leg termination point (or endpoint). In this regard, the leg path may be defined by a heading, course, arc, or other directional qualifier, while the leg termination point may be defined by a specific navigational reference point (or waypoint) or the aircraft satisfying a particular condition (e.g., a certain altitude). The combined sequence of procedural legs defines the trajectory associated with the procedure.

Still referring to FIG. 1, in the illustrated embodiment, the aircraft 120 includes, without limitation, a display device 122, a user input device 124, a processing system 126, a display system 128, a communications system 130, a navigation system 132, a flight management system (FMS) 134, and one or more avionics systems 136. The display device 122 is an electronic display capable of graphically displaying flight information or other data associated with operation of the aircraft 120 under control of the display system 128 and/or processing system 126. The user input device 124 is coupled to the processing system 126, and the user input device 124 and the processing system 126 are cooperatively configured to allow a user (e.g., a pilot, co-pilot, or crew member) to interact with the display device 122 and/or other elements onboard the aircraft 120.

The display system 128 generally represents the hardware, firmware, and/or other components configured to control the display and/or rendering of one or more displays pertaining to operation of the aircraft 120 and/or systems 130, 132, 134, 136 on the display device 122 (e.g., synthetic vision displays, navigational maps, and the like). In this regard, the display system 128 may access or include one or more databases suitably configured to support operations of the display system 128, such as, for example, a terrain database, an obstacle database, a navigational database, a geopolitical database, a terminal airspace database, a special use airspace database, or other information for rendering and/or displaying content on the display device 122.

The navigation system 132 generally represents the onboard components configured to obtain or provide real-time navigational data and/or information regarding operation of the aircraft 120. The navigation system 132 may be realized as a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the navigation system 132, as will be appreciated in the art. The navigation system 132 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 132 is also capable of obtaining or otherwise determining the heading of the aircraft 120 (i.e., the direction the aircraft is traveling in relative to some reference).

In the illustrated embodiment, the aircraft 120 also includes a communications system 130 configured to support communications to and/or from the aircraft 120. In this regard, the communications system 130 may include a data link system or another suitable radio communication system that supports communications between the aircraft 120 and the computing system 102.

The FMS 134 is coupled to the navigation system 132, the communications system 130, and one or more additional avionics systems 136 to support navigation, flight planning, and other aircraft control functions in a conventional manner, as well as to provide real-time data and/or information regarding the operational status of the aircraft 120. Practical embodiments of the aircraft 120 will include numerous avionics systems 136 for providing various functions and features, as will be appreciated in the art. For example, practical embodiments of the aircraft 120 will likely include one or more of the following avionics systems suitably configured to support operation of the aircraft 120: an air traffic management system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Additionally, the aircraft 120 may include one or more flight data recorders (FDRs), quick access recorders (QARs), and/or the like configured to capture or otherwise obtain flight data in real-time.

The processing system 126 generally represents the hardware, circuitry, processing logic, and/or other components configured to support storage, maintenance, and/or provisioning of flight data captured or otherwise obtained by one of more onboard systems 132, 134, 136 for purposes of the procedure mapping processes and related task, functions and/or operations, as described in greater detail below. However, it should be noted that in other embodiments, any features and/or functionality of processing system 126 described herein can be implemented by or otherwise integrated with the features and/or functionality provided by the FMS 134 or another onboard component or system (e.g., by an FDR, QAR, or other onboard data recording system). In other words, some embodiments may integrate the processing system 126 with another system or component onboard the aircraft 120, that is, the processing system 126 described herein may be a component of the FMS 134 or other avionics 136. Additionally, it should be understood that FIG. 1 is a simplified representation of the flight analysis system 100 for purposes of explanation and ease of description, and FIG. 1 is not intended to limit the application or scope of the subject matter described herein in any way.

As described in greater detail below in the context of FIGS. 2-4, in exemplary embodiments, the computing system 102 analyzes flight records 103 for completed flights to automatically identify which procedure(s) in the procedure database 106 were flown during the respective flights and correspondingly update the flight records 103 to maintain the association between the flight record 103 and the identified procedures flown during that flight. In this regard, a flight record 103 may include periodically recorded or reported aircraft position data that may be utilized to derive an aircraft trajectory. For example, the current latitude, current longitude, current altitude, the current heading, the current speed, and other flight data may be periodically recorded or captured by the processing system 126 or another onboard component (e.g., a FDR, QAR, or the like) at regular intervals (e.g., on a per second basis, every 5 seconds, every 10 seconds, etc.) and timestamped or otherwise maintained in a time ordered sequence, thereby allowing the aircraft speed and trajectory to be estimated, interpolated, or otherwise determined.

Based on the combination of the airport and runway associated with the flight, a set of potential procedures associated with that combination may be identified in the procedure database 106. The flown aircraft trajectory is then compared against each of the potential procedures to identify or otherwise determine which procedure most closely corresponds to or aligns with the flown aircraft trajectory. The computing system 102 updates the flight record 103 to assign the potential procedure that the flown aircraft trajectory most closely adheres to as the procedure that was flown by the aircraft during that flight. For any given flight record 103, the computing system 102 may map the flown aircraft trajectory represented by its associated flight data to multiple different procedures, including, for example, a departure procedure associated with the combination of departure runway and departure airport associated with the flight record 103, an arrival route associated with the combination of destination runway and destination airport associated with the flight record 103, an approach procedure associated with the combination of destination runway and destination airport associated with the flight record 103, and the like.

Figure 2:
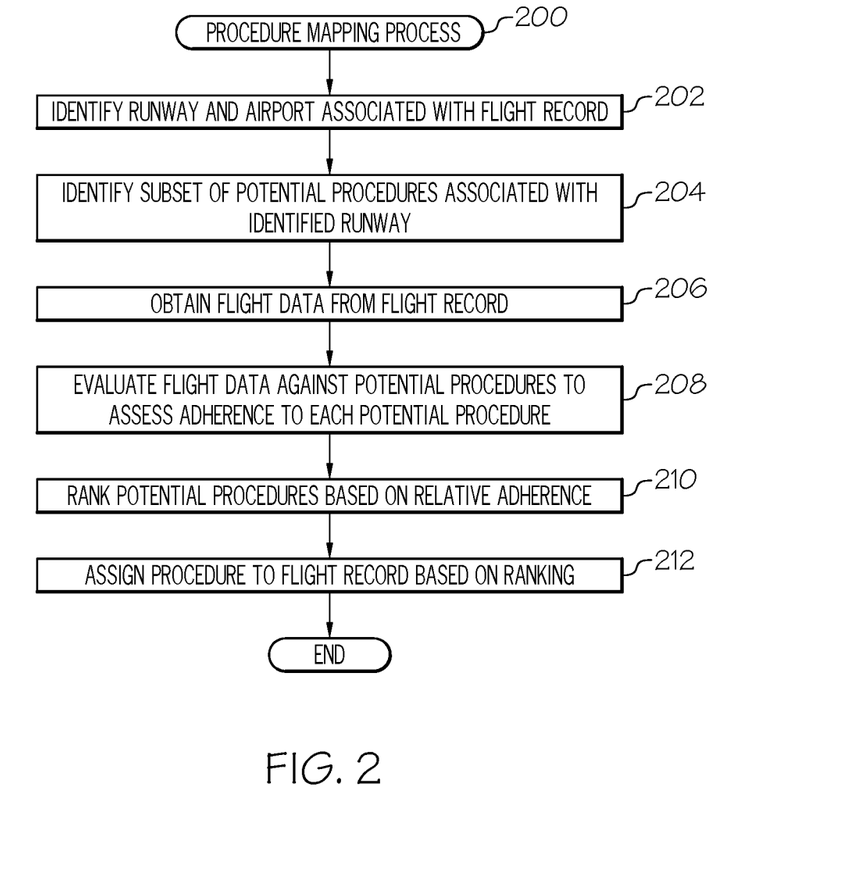
FIG. 2 is a flow diagram of an exemplary procedure mapping process suitable for implementation by the flight analysis system of FIG. 1.

Referring now to FIG. 2, in an exemplary embodiment, the flight analysis system 100 is configured to support a procedure mapping process 200 to identify and assign aircraft procedures to flight records based on the flight data associated with the respective flight records. In this regard, the procedure mapping process 200 may be performed in response to receiving a new flight record or with respect to a previously-stored flight record that lacks an existing association with one or more procedures. For example, the computing system 102 may perform the procedure mapping process 200 on each new flight record received from an aircraft 120 prior to storing the flight record in the flight records database 104, or alternatively, the computing system 102 may analyze the flight record database 104 to identify flight records that lack association to one or more different types of aircraft procedures. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the procedure mapping process 200 may be performed by different elements of the system 100, however, exemplary embodiments may be described herein as primarily being performed by the computing system 102 and/or the processing system 112. It should be appreciated that the procedure mapping process 200 may include any number of additional or alternative tasks, the tasks need not be performed in the illustrated order and/or the tasks may be performed concurrently, and/or the procedure mapping process 200 may be incorporated into a more comprehensive procedure or process having additional functionality not described in detail herein. Moreover, one or more of the tasks shown and described in the context of FIG. 2 could be omitted from a practical embodiment of the procedure mapping process 200 as long as the intended overall functionality remains intact.

In exemplary embodiments, the procedure mapping process 200 begins by identifying or otherwise determining the combination of runway and airport associated with the flight record under analysis and then identifying or otherwise determining a subset of potential procedures for analysis based on that runway and airport combination (tasks 202, 204). In this regard, the procedure mapping process 200 identifies a subset of potential aircraft procedures that represents the potential procedures that the aircraft 120 could have flown to/from the identified runway at the identified airport. For example, based on the runway and airport associated with a flight record 103, the computing system 102 and/or processing system 112 may query the procedure database 106 to obtain a listing of the aircraft procedures associated with that runway at that particular airport. In some embodiments, the subset of potential aircraft procedures may be further reduced based on whether the airport is the departure or arrival location for the flight. For example, in the case of a departure airport, the computing system 102 and/or processing system 112 may query the procedure database 106 for only the departure procedures associated with the identified runway at that departure airport. Similarly, for an arrival airport, the computing system 102 and/or processing system 112 may query the procedure database 106 for only the arrival route and/or approach procedures associated with the identified runway at that arrival airport.

The procedure mapping process 200 receives or otherwise obtains at least the portion of the flight data from the flight record that corresponds to the aircraft's operation in the vicinity of the airport associated with the subset of potential procedures to be analyzed, and then evaluates or otherwise compares the flight data to the procedure information for each of the potential procedures to determine how well the flight data adheres to or aligns with the respective procedure (tasks 206, 208). In this regard, for each potential procedure of the subset, the procedure mapping process 200 attempts to map the actual trajectory flown by the aircraft 120 to the trajectory defined by the procedure information for the respective procedure, as described in greater detail below in the context of FIG. 3-4. In exemplary embodiments, for each potential procedure, the procedure mapping process 200 calculates or otherwise determines one or more metrics that quantifies the degree to which the flown aircraft trajectory adheres to or otherwise realizes the procedure's trajectory, such as, for example, the number of legs of the procedure trajectory that were flown, the percentage of the procedure trajectory that was flown, and/or the like.

Still referring to FIG. 2, in exemplary embodiments, after analyzing the flown aircraft trajectory with respect to each potential procedure of the identified subset, the procedure mapping process 200 ranks, prioritizes, or otherwise orders the potential procedures based on the degree of adherence between the flown aircraft trajectory and the procedure-defined trajectory (task 210). In this regard, when multiple different adherence metrics are determined, an aggregate adherence score may be calculated or otherwise determined for each procedure based on the adherence metric(s) calculated for the flown aircraft trajectory with respect to the procedure's trajectory, for example, using a weighted average of the adherence metrics or some other function of the different adherence metrics. Each potential procedure may be ranked or ordered with respect to other potential procedures based on its associated adherence score relative to the adherence scores associated with those other potential procedures to obtain an ordered listing of the potential procedures according to adherence with the flown aircraft trajectory.

The illustrated procedure mapping process 200 continues by assigning a potential procedure to the flight record based on its adherence ranking relative to the other potential procedures (task 212). For example, in one or more embodiments, the procedure mapping process 200 identifies the potential procedure having the highest adherence score or metric as the procedure most likely to have been attempted to be flown by the aircraft and assigns the highest ranked procedure to the flight record 103. In this regard, the computing system 102 and/or the processing system 112 updates the entry for the flight record 103 to include the name or other indicia of the identified procedure to be assigned to the flight record 103 and thereby maintain an association between the flight record 103, its associated flight data, and the identified procedure.

In one or more exemplary embodiments, the procedure mapping process 200 is performed to identify and assign departure procedures, approach procedures, arrival routes, and the like to each flight record 103 maintained in the flight records database 104. Additionally, in response to new flight records uploaded to the computing system 102 and/or the flight records database 104, the procedure mapping process 200 may be performed to assign aircraft procedures to the newly received flight records.

Figure 3:
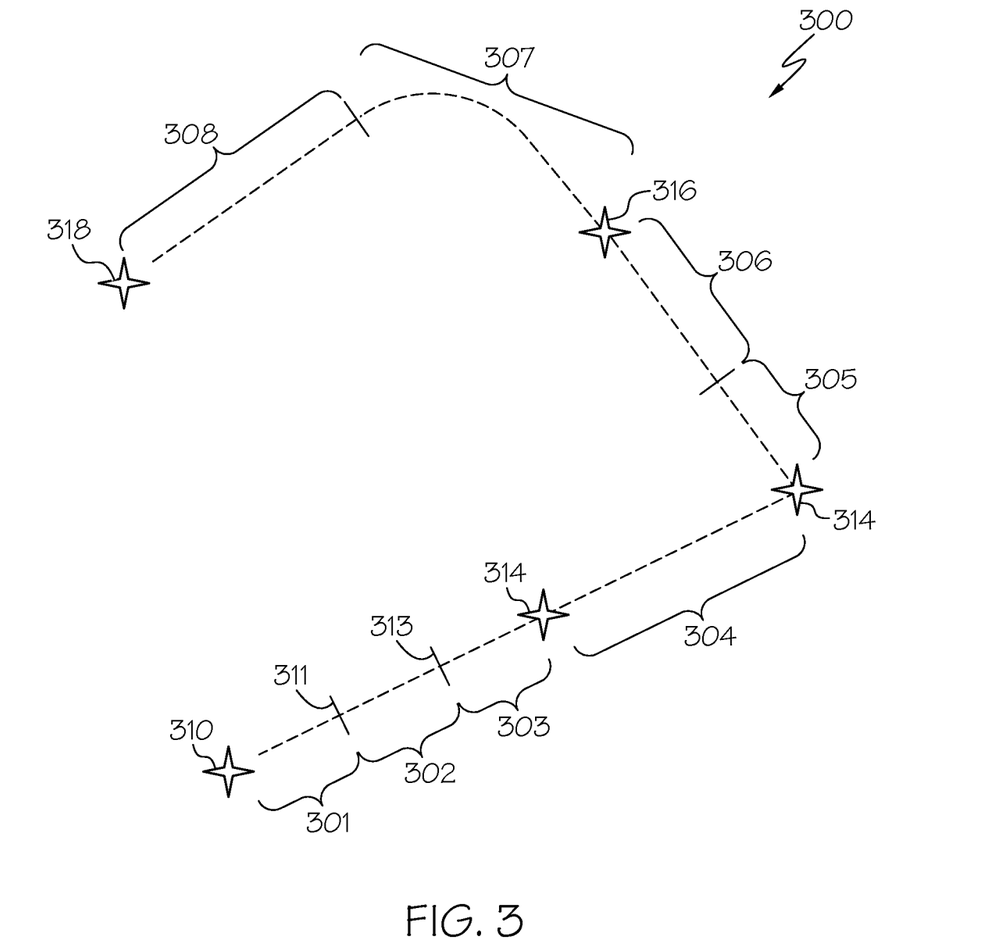
FIGS. 3-4 depict an exemplary aircraft procedure and an aircraft trajectory mapped to that aircraft procedure in accordance with an exemplary embodiment of the procedure mapping process of FIG. 2.
Figure 4:
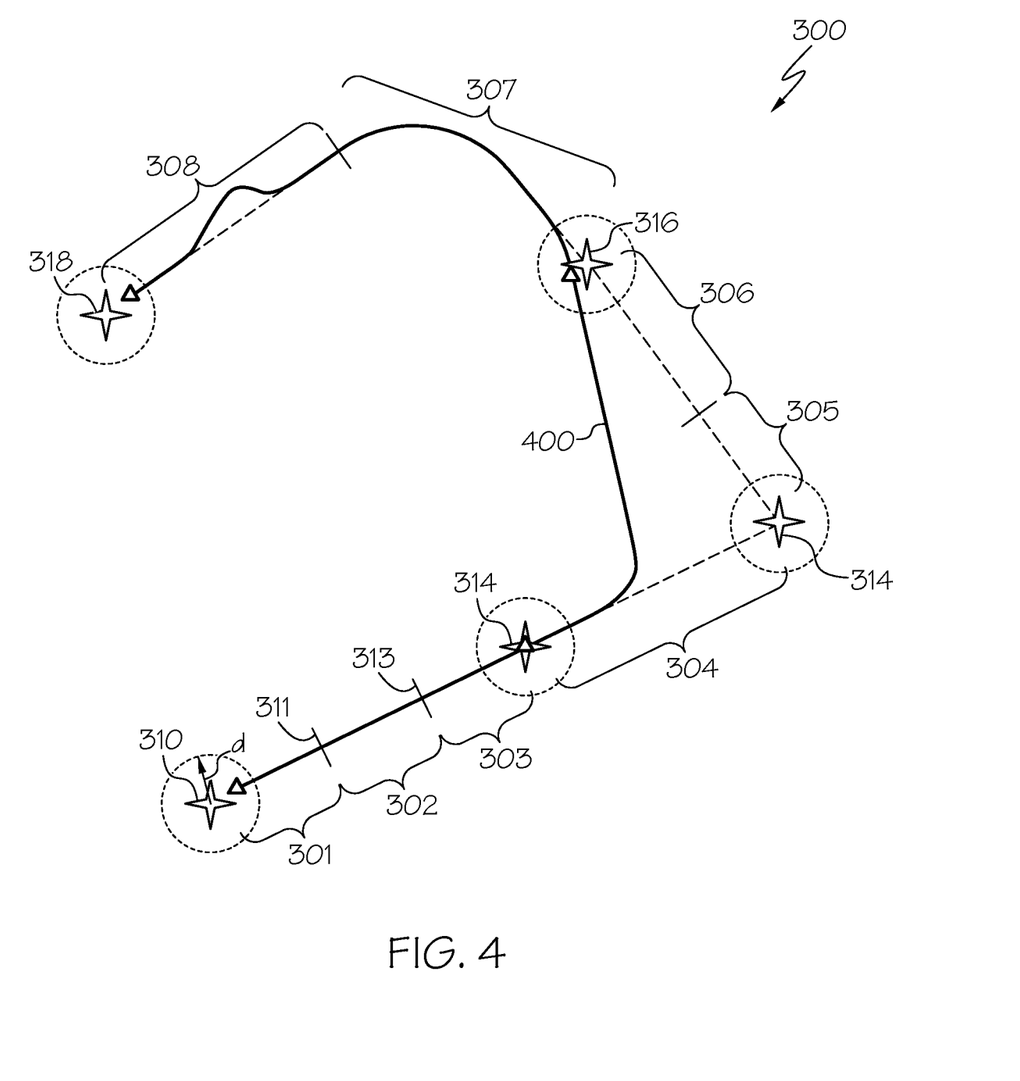

FIG. 3 depicts an exemplary aircraft procedure 300 suitable for use with the procedure mapping process 200 to analyze the aircraft procedure 300 with respect to a flown aircraft trajectory 400 depicted in FIG. 4. Based on the relationship between the flown aircraft trajectory 400 and the trajectory defined by the aircraft procedure 300, the procedure mapping process 200 calculates or otherwise determines one or more adherence metric(s) associated with the aircraft procedure 300 for that aircraft trajectory 400 to be utilized in determining whether to assign the aircraft procedure 300 to the aircraft trajectory 400, as described in greater detail below.

Referring to FIG. 3, the procedure information associated with the illustrated aircraft procedure 300 defines eight procedural legs 301, 302, 303, 304, 305, 306, 307, 308 from an initial navigational reference point 310 (or waypoint) to a final waypoint 318 via intermediate waypoints 312, 314, 316. The procedure information defines both conditional legs 301, 302, 303, 305, 306, 307, 308 and an unconditional leg 304 for traversing the waypoints 312, 314, 316, 318. In this regard, an unconditional leg 304 has a substantially fixed length between endpoints defined by waypoints 312, 314 while conditional legs 301, 302, 303, 305, 306, 307, 308 are defined by manner in which they are flown or executed according to the parameters or instructions associated with the procedure 300 such that the exact trajectory and length of any individual conditional leg 301, 302, 303, 305, 306, 307, 308 may vary depending on the aircraft performance satisfying a particular termination condition (e.g., a particular altitude level). For example, the first conditional procedural leg 301 may be realized as a course from a fix (e.g., waypoint 310) to an altitude, such that the termination point 311 of the first conditional procedural leg 301 occurs when the aircraft reaches that prescribed altitude while flying along the prescribed course or heading after traversing the initial waypoint 310. It should be noted that both conditional or unconditional legs may have any number of constraints associated therewith that define the respective leg, which could be applicable at either or both endpoints of a respective leg or while the aircraft is en route between endpoints of the leg.

Figure 5:
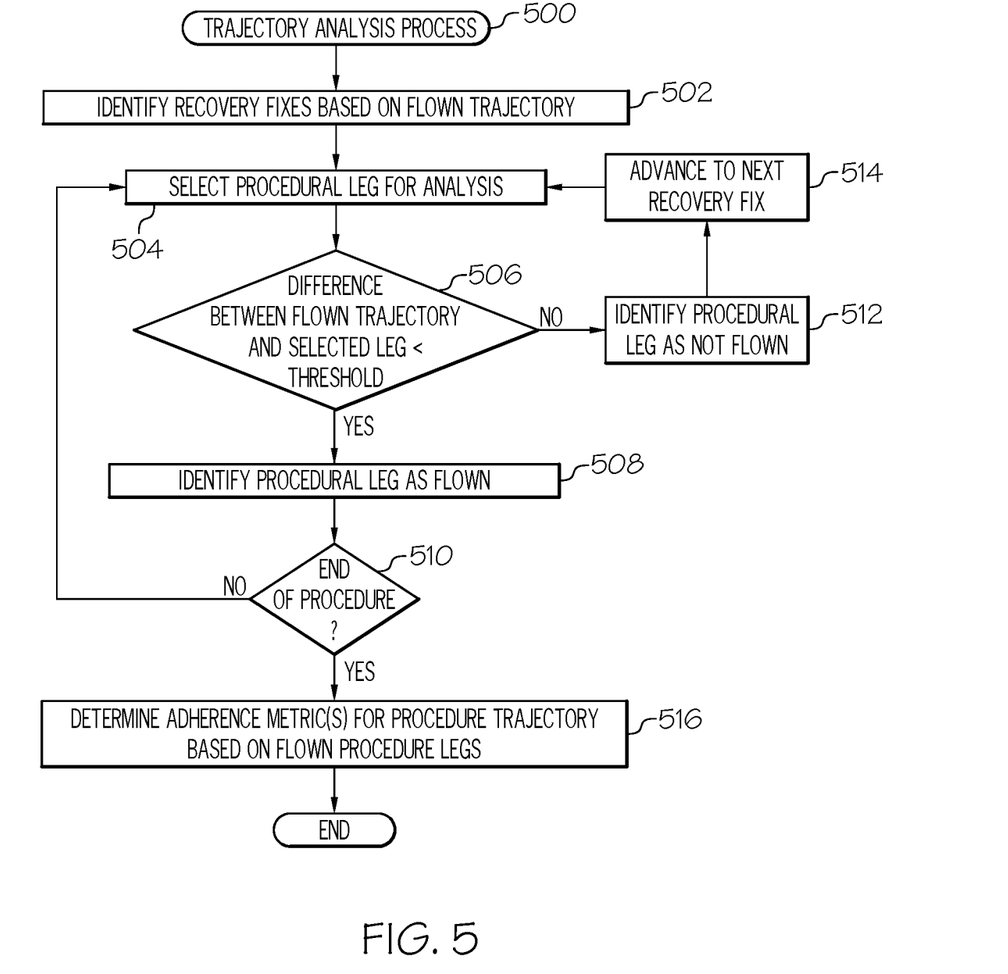
FIG. 5 depicts a flow diagram of an exemplary trajectory analysis process suitable for implementation by the flight analysis system of FIG. 1 in connection with the procedure mapping process of FIG. 2.

FIG. 5 depicts an exemplary embodiment of a trajectory analysis process 500 suitable for use in a flight analysis system 100 in connection with the procedure mapping process 200 (e.g., task 208) to determine the degree to which a flown trajectory, such as trajectory 400, adheres to a reference trajectory defined by an aircraft procedure of interest (alternatively referred to herein as a procedure-defined trajectory or procedure trajectory), such as aircraft procedure 300. It should be appreciated that the trajectory analysis process 500 may include any number of additional or alternative tasks, the tasks need not be performed in the illustrated order and/or the tasks may be performed concurrently, and/or the trajectory analysis process 500 may be incorporated into a more comprehensive procedure or process having additional functionality not described in detail herein. Moreover, one or more of the tasks shown and described in the context of FIG. 5 could be omitted from a practical embodiment of the trajectory analysis process 500 as long as the intended overall functionality remains intact.

Referring to FIG. 5 with continued reference to FIGS. 3-4, in exemplary embodiments, the trajectory analysis process 500 begins by defining recovery fixes along the procedure trajectory based on the relationship between the flown trajectory and the procedure trajectory (task 502). The computing system 102 and/or the processing system 112 obtains or otherwise identifies, based on the procedure information from the procedure database 106, the geographic location of the waypoints 310, 312, 314, 316, 318 involved in the aircraft procedure 300 being analyzed. The computing system 102 and/or the processing system 112 also obtains the flight data from the flight record 103 that defines the flown trajectory 400 and then analyzes the flown trajectory 400 with respect to the location of the waypoints 310, 312, 314, 316, 318 to designate or otherwise identify one or more of the waypoints as a recovery fix when the flown trajectory 400 comes within at least a threshold distance (d) of the respective waypoint(s). For example, in the illustrated embodiment of FIG. 4, the first, second, fourth and fifth waypoints 310, 312, 316, 318 are defined as recovery fixes based on the flight data from the aircraft position reports indicating that at least a portion of the flown trajectory 400 is within a threshold distance of each of the respective waypoints 310, 312, 316, 318. Conversely, the third waypoint 314 is not designated as a recovery fix or is otherwise excluded from the group of recovery fixes because the flown trajectory 400 does not come within the threshold distance of the third waypoint 314.

After defining recovery fixes, the trajectory analysis process 500 sequentially analyzes the flown trajectory 400 with respect to the procedure trajectory by selecting or otherwise identifying an initial procedure leg for analysis and determining whether the flown trajectory maps or otherwise corresponds to that procedure leg (tasks 504, 506). In this regard, the computing system 102 and/or the processing system 112 obtains or otherwise identifies, based on the instructions, conditions, or other procedure information from the procedure database 106, the initial procedural leg 301 from the initial waypoint 310 (or initial recovery fix) for the procedure 300. The computing system 102 and/or the processing system 112 then analyzes or otherwise compares the flight data for the portion of the flown trajectory 400 starting at or near the initial waypoint 310 to identify or otherwise determine whether the flown trajectory 400 adheres to or otherwise satisfies the instructions, conditions, or other criteria that define the initial procedural leg 301.

For example, if the initial procedural leg 301 is realized as a fix-to-altitude leg having instructions that provide a defined heading or course from the waypoint 310 until reaching an altitude criterion defining the leg termination point 311, the computing system 102 and/or the processing system 112 starts from the aircraft position report closest to the initial waypoint 310 and then analyzes flight data from successive aircraft position reports to determine whether the flown trajectory 400 is substantially aligned with the course or heading associated with the initial procedural leg 301 for the duration of time or travel distance required to reach the altitude criterion that defines the leg termination point 311. In this regard, for each successive aircraft position report from the initial waypoint 310, the computing system 102 and/or the processing system 112 may verify the current latitude and longitude coordinates of the aircraft 120 at the time of the aircraft position report is within a threshold distance of the lateral trajectory for the initial procedural leg 301, that the current heading or course of the aircraft 120 at the time of the aircraft position report is within a threshold of the heading or course associated with the initial procedural leg 301, that the current altitude of the aircraft 120 at the time of the aircraft position report satisfies one or more altitude criteria associated with the initial procedural leg 301 (e.g., below a maximum altitude associated with the waypoint 310 and/or the termination point 311, above an altitude defining the termination point 311), and the like.

When the flown trajectory is maintained within a threshold (e.g., a threshold distance, a threshold course, or the like) difference of the procedure-defined trajectory for the leg under analysis, the trajectory analysis process 500 designates or otherwise identifies that procedure leg as having been flown or otherwise realized by the flown trajectory 400 during the flight under analysis (task 508). For example, in the illustrated embodiment, the initial procedural leg 301 is determined to have been flown by the aircraft based on the portion of the flown trajectory 400 following the initial waypoint 310 being maintained within a threshold difference of the procedure-defined trajectory for the initial procedural leg 301. After determining a procedure leg was flown, the trajectory analysis process 500 continues by selecting the next procedural leg in the procedure sequence for analysis until reaching the end of the procedure (tasks 504, 506, 508, 510). For example, similar to the initial procedural leg 301, the second procedural leg 302 may be identified or otherwise designated as having been flown by the aircraft based on the flight data from the aircraft position reports following the termination point 311 for the initial procedural leg 301 indicating the flown trajectory 400 after executing the initial procedural leg 301 substantially aligns with or otherwise adheres to the instructions, parameters, or other criteria defining the second procedural leg 302 by being maintained within a threshold of the procedure-defined trajectory until the aircraft reaches or otherwise satisfies the condition(s) that define the termination point 313 for the second procedural leg 302. Likewise, the third procedural leg 303 may be identified or otherwise designated as having been flown by the aircraft based on the flight data from the aircraft position reports between the second leg termination point 313 and the second waypoint 312 indicating the flown trajectory 400 aligns with or otherwise adheres to the procedure information for the third procedural leg 303.

When the flown trajectory does not map to the procedure-defined trajectory or otherwise deviates from the procedure-defined trajectory by more than the adherence threshold, the trajectory analysis process 500 designates or otherwise identifies the procedural leg as having not been flown and advances to the next recovery fix to resume analysis of the procedure (tasks 512, 514). In this regard, the current procedural leg of interest and any intervening procedural legs between the current procedural leg and the next recovery fix along the procedure-defined trajectory are designated as having not been flown due to the flown trajectory deviating from the procedure-defined trajectory. The next recovery fix is then utilized to resume analysis of the flown trajectory from that recovery fix onward. For example, as illustrated in FIG. 4, the flown trajectory 400 deviates from the trajectory defined by the instructions, criterion, or other procedure information for the fourth procedural leg 304 by more than the adherence threshold prior to reaching the third waypoint 314, resulting in the fourth procedural leg 304 being designated as not flown by the aircraft. Additionally, intervening procedural legs 305, 306 along the procedure-defined trajectory between the next recovery fix following the fourth procedural leg 304 (fourth waypoint 316) and the fourth procedural leg 304 are also designated as having not been flown or realized by the aircraft.

Thereafter, the trajectory analysis process 500 selects the seventh procedural leg 307 emanating from the recovery fix waypoint 316 for resuming analysis (task 504). The loop defined by tasks 504, 506, 508, and 510 repeats until reaching the final waypoint 318 of the procedure 300 to identify or otherwise designate the seventh and eight procedural legs 307, 308 as having been flown based on the deviations between the flown trajectory 400 and the respective procedural legs 307, 308 being maintained within the applicable adherence thresholds.

In some embodiments, the trajectory analysis process 500 may be configured to identify or otherwise designate some procedural legs as partially flown when the flown trajectory 400 only maps to a portion of a respective procedural leg. For example, in the embodiment shown in FIG. 4, the fourth procedural leg 304 may be designated as partially flown based on the flown trajectory 400 adhering to the instructions, criteria, or other procedure information for flying the fourth procedural leg 304 after traversing the second waypoint 312 before deviating beyond the threshold at some later point prior to reaching the third waypoint 314.

Additionally, it should be noted that in some embodiments, the trajectory analysis process 500 may also analyze the procedure in reverse from the final waypoint or recovery fixes rather than designating intervening procedural legs as having not been flown or realized based solely on analyzing the procedure in the sequential order as flown. This allows the trajectory analysis process 500 to identify additional legs that were completely and/or partially flown or otherwise improve the mapping of the flown trajectory to the procedure, thereby improving the accuracy or reliability of the mapping between the trajectory and the procedure, which, in turn improves the accuracy or reliability of the subsequently calculated adherence metrics and related analysis. For example, the trajectory analysis process 500 may advance to the recovery fix waypoint 316 and resume analysis backwards to determine whether the preceding procedural leg 306 was still flown (e.g., by analyzing the trajectory to see if the aircraft arrived at the recovery fix waypoint 316 via the prescribed course for the preceding procedural leg 306). In this regard, if the aircraft had flown the fourth procedural leg 304 and then deviated from the fifth procedural leg 305 before executing the sixth procedural leg 306, analyzing the flown trajectory backwards from the recovery fix waypoint 316 would allow for the trajectory analysis process 500 to identify the sixth procedural leg 306 as having been completely or partially flown even though the preceding procedural leg 305 between recovery fixes 314, 316 was not flown.

After analyzing the flown trajectory with respect to the entire procedure, the illustrated embodiment of the trajectory analysis process 500 calculates or otherwise determines one or more adherence metrics for the procedure based on the number or amount of procedural legs of the procedure that were mapped to the flown trajectory (task 514). For example, the computing system 102 and/or the processing system 112 may determine the total number of procedural legs that the flown trajectory 400 mapped to (e.g., 5), the percentage of procedural legs that the flown trajectory 400 was mapped to (e.g., 62.5%), the number or percentage of unconditional legs flown (e.g., 0), the number or percentage of conditional legs flown (e.g., 5 or 71.4%), and/or the like. Additionally, the computing system 102 and/or the processing system 112 may calculate or otherwise determine the amount of travel distance or travel time during which the flown trajectory 400 was in adherence with the procedure-defined trajectory, the corresponding percentage of the travel distance or travel time in adherence with the procedure-defined trajectory (e.g., based on the total distance or travel time between end points 310, 318), and/or other metrics that quantify or otherwise characterize the degree of adherence between the flown trajectory 400 and the procedure 300. In this regard, the adherence metrics quantify how close the flown trajectory 400 came to executing or otherwise realizing the particular procedure 300 of interest as defined by its associated instructions, parameters, criteria or other procedure information.

In some embodiments, the adherence metrics may be utilized to score the overall adherence to the procedure of interest or otherwise determine a probability or likelihood that the aircraft intended or attempted to fly the procedure of interest. For example, a product or weighted combination of the number or percentage of procedural legs flown and the percentage of travel time flown in adherence with a procedure may be utilized to assign a probability of having been flown to a given procedure, such that a procedure having a relatively higher percentage of procedural legs flown over a greater percentage of travel time is assigned a higher probability than a procedure having a relatively lower percentage of procedural legs flown and/or a relatively lower percentage of travel time flown in adherence.

Referring again to FIG. 2, in one or more exemplary embodiments, the trajectory analysis process 500 is performed with respect to each potential procedure to determine how well the flight data for the flight record of interest adheres to each potential procedure for a given runway and airport combination (e.g., task 208). As described above, the adherence metric(s) determined for each of the potential procedures may be utilized to rank, score, prioritize, or otherwise assess the potential procedures to identify the potential procedure that the flown trajectory best adheres to or the potential procedure that was most likely to have been the procedure that the aircraft was attempting to execute or realize. In this regard, the subject matter described herein is not intended to be limited to any particular manner of identifying a procedure to be assigned to a flight record, as the potential procedures may be sorted or prioritized in any number of different ways (e.g., prioritized primarily based on percentage of procedural legs flown and secondarily based on percentage of travel time flown in adherence) to arrive at the procedure to be assigned to the flight record. Moreover, some embodiments may assign multiple potential procedures to a flight record 103 according to their relative probabilities or adherences. For example, different procedures may be assigned to a flight record 103 but assigned different weightings, probabilities, or the like to enable more robust probabilistic or statistical analysis of the different procedures. For example, to assess the relative cost, efficiency, safety, or the like for an individual procedure, the flight records database 104 may be queried to identify all of the flight records 103 that are assigned or otherwise associated with that procedure. The corresponding flight data for those flight records 103 may be combined using the relative weightings or probabilities characterizing the degree of adherence with that procedure to probabilistically construct a nominal "as-flown" trajectory for that procedure based on the historical flight records 103, with the nominal trajectory then being analyzed to estimate performance or costs (e.g., fuel required, travel time required, and/or the like), safety, or other operational impacts or effects associated with the particular procedure.

By mapping or otherwise correlating historical flight records and their associated data to the procedures that were flown during those flights, an improved analysis of the procedures may be performed based on the flight data representing the procedures as they are actually likely to be executed or flown, rather than relying solely on the static procedure information that represents the procedure as defined on paper. Thus, more accurate or realistic impacts on performance and/or costs (e.g., fuel, travel time, and/or the like) associated with a procedure may be determined, while also allowing for improved analysis of the safety, traffic impacts, or other impacts of flying a given procedure based on how the procedure is likely to be actually flown, which, in turn may be utilized to identify preferred procedures for a particular runway assigned to the aircraft en route to/from an airport (e.g., the lowest cost departure route or arrival route, the approach procedure having the highest adherence rates, the highest overall usage rate, etc.). For example, if the flight records indicate a particular procedure flown significantly more often than any other potential procedure for a particular runway at a particular airport, that procedure may be identified as the preferred procedure for that runway, which, in turn, may be utilized for training purposes to improve safety (e.g., by increasing use of that procedure in flight simulators, increased briefing of that procedure, etc.).

For the sake of brevity, conventional techniques related to aircraft procedures, flight planning, data recorders, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A non-transitory computer readable medium storing instruction that, when executed by one or more processors, cause the one or more processors to perform a method comprising:
    obtaining aircraft position data defining an aircraft trajectory for a flight completed by an aircraft, by at least one processor, wherein a flight record maintains the aircraft position data in association with identification of an airport and a runway associated with the flight;
    performing an analysis of the aircraft position data, by the at least one processor, by:
        accessing a database comprising at least a potential procedure applicable to the airport and the runway, the potential procedure comprising a set of instructions directing aircraft use of a set of legs;
        mapping the aircraft trajectory to a reference trajectory defined by the set of legs;
        when the aircraft trajectory is maintained within a threshold of one or more of the set of legs, determining that the aircraft trajectory includes the potential procedure;
    identifying a procedure flown by the aircraft during the flight, based on the analysis, wherein the procedure comprises the potential procedure; and
    updating the flight record to store the procedure in a data storage element in association with the flight record.

2. The non-transitory computer readable medium of claim 1, further comprising:
    mapping recovery fix waypoints to points on the aircraft trajectory, wherein each of the recovery fix waypoints are located within a predetermined threshold of one of the points on the aircraft trajectory;
    identifying groups of the set of legs bounded by pairs of the recovery fix waypoints;

for one of the groups bounded by one of the pairs comprising a first recovery fix waypoint and a second recovery fix waypoint:
  determine whether conditions of the procedure are met by the one of the groups bounded by the one of the pairs;
  when the conditions are met, determine that the one of the groups was flown by the aircraft during the flight, identify an endpoint of the one of the groups as a beginning point of a second one of the groups bounded by a second one of the pairs, and proceed to evaluate the second one;
  when a subset of the conditions are met, determine that the one of the groups was partially flown by the aircraft during the flight; and
  when none of the conditions are met, determine that the one of the groups was not flown by the aircraft during the flight, determine that the endpoint is not defined, define the second recovery fix waypoint as the beginning point of the second one of the groups, and proceed to evaluate the second one.

3. The non-transitory computer readable medium of claim 1, further comprising determining an adherence metric for the potential procedure based on the one or more of the set of legs where the aircraft trajectory is maintained within the threshold, wherein identifying the procedure comprises identifying the potential procedure as having been flown by the aircraft during the flight based on the adherence metric.

4. The non-transitory computer readable medium of claim 1, wherein
  the aircraft position data comprise one or more of latitude positions for the aircraft, longitude positions for the aircraft, altitude values for the aircraft, and heading data for the aircraft;
  the aircraft trajectory indicates speed values for the aircraft based on aircraft position changes; and
  the potential procedure comprises a departure procedure or an arrival procedure.

5. The non-transitory computer readable medium of claim 4, further comprising identifying one or more preferred procedures for use by the aircraft, by the at least one processor, wherein the one or more preferred procedures comprise at least the procedure.

6. A non-transitory computer readable medium storing instruction that, when executed by one or more processors, cause the one or more processors to perform a method comprising:
  identifying a set of procedures for potential association with a travel record;
  identifying a probable procedure from among the set of procedures based on a mapping of an aircraft trajectory for a flight completed by an aircraft to the probable procedure defined by a set of legs; and
  updating the travel record to maintain an association with the probable procedure in response to determining that the aircraft trajectory is maintained within a threshold of one or more of the set of legs.

7. The non-transitory computer readable medium of claim 6, wherein identifying the probable procedure comprises:
  determining, for each procedure of the set of procedures, a respective adherence metric value based on a relationship between a respective trajectory defined by the respective procedure and position data associated with the travel record; and
  selecting the probable procedure from among the set of procedures based on the respective adherence metric value associated with the probable procedure relative to other procedures of the set of procedures.

8. The non-transitory computer readable medium of claim 7, further comprising ranking the set of procedures according to the respective adherence metric values, wherein selecting the probable procedure comprises identifying a highest ranked procedure in the ranked set of procedures.

9. The non-transitory computer readable medium of claim 7, wherein determining the respective adherence metric value comprises determining a respective number of legs associated with the respective procedure were executed by a vehicle based on a relationship between the respective trajectory defined by the legs associated with the respective procedure and the aircraft trajectory corresponding to the position data associated with the travel record.

10. The non-transitory computer readable medium of claim 9, wherein determining the respective number of legs that were executed comprises, for each leg associated with the respective procedure where the aircraft trajectory is maintained within the threshold of the respective trajectory defined by the respective leg, identifying the respective leg as having been executed by the vehicle.

11. The non-transitory computer readable medium of claim 10, further comprising:
  defining a plurality of recovery fixes for the respective procedure based on the relationship between the aircraft trajectory and respective navigational reference points associated with the respective procedure; and
  when the aircraft trajectory deviates from the respective trajectory defined by the respective leg by more than the threshold:
    designating the respective leg as not having been executed by the vehicle; and
    advancing analysis of the legs associated with the respective procedure to a next recovery fix of the plurality of recovery fixes.

12. The non-transitory computer readable medium of claim 6, further comprising determining a performance metric associated with the probable procedure based on position data associated with the travel record.

13. The non-transitory computer readable medium of claim 6, further comprising evaluating the aircraft trajectory corresponding to the position data associated with the travel record with respect to a respective reference trajectory defined by procedural legs of each respective procedure of the set of procedures to determine a respective adherence metric associated with each respective procedure of the set of procedures based on a relationship between the aircraft trajectory and the procedural legs, wherein identifying the probable procedure comprises identifying the probable procedure based on the respective adherence metric.

14. The non-transitory computer readable medium of claim 13, wherein the adherence metric comprises a number or a percentage of the procedural legs of the respective procedure that were traversed within the threshold by the aircraft trajectory.

15. The non-transitory computer readable medium of claim 13, the travel record comprising a flight record for the flight by the aircraft and the position data comprises flight data for the aircraft during the flight, the flight record maintaining an association between the flight and a runway, wherein:
  identifying the set of procedures comprises identifying a subset of potential procedures associated with the runway; and the subset of potential procedures comprises one of approach procedures, departure procedures, or arrival routes associated with the runway.

16. A system comprising:
a data storage element to maintain a flight record comprising flight data pertaining to operation of an aircraft in connection with a runway at an airport; and
a processing system coupled to the data storage element configured to:
identify a subset of procedures associated with the runway;
determine one or more adherence metrics associated with each procedure of the subset based on a mapping of an aircraft trajectory for a flight completed by the aircraft to respective probable procedure defined by a set of legs;
identify a probable procedure from among the subset of the procedures based on the one or more adherence metrics in response to determining that the aircraft trajectory is maintained within a threshold of one or more of the set of legs; and
assign the probable procedure to the flight record in the data storage element.

17. The system of claim 16, further comprising a procedure database including procedure information for the procedures associated with the runway, wherein the processing system is coupled to the procedure database to obtain the procedure information and determine the one or more adherence metrics by:
identifying reference trajectories associated with respective procedure legs of the respective procedure using procedure information; and
comparing the aircraft trajectory represented by the flight data to the reference trajectories to determine the one or more adherence metrics based on a relationship between the aircraft trajectory and the reference trajectories.

18. The system of claim 17, wherein the one or more adherence metrics include a number of the respective procedure legs of the respective procedure that were flown by the aircraft.

19. The system of claim 18, wherein the aircraft trajectory is within the threshold of the number of the respective procedure legs of the respective procedure that were flown.

20. The non-transitory computer readable medium of claim 12, wherein the performance metric associated with the probable procedure includes one of: fuel, time, or cost associated with the probable procedure.

* * * * *